US008774038B2

(12) United States Patent
Sarikaya

(10) Patent No.: US 8,774,038 B2
(45) Date of Patent: Jul. 8, 2014

(54) MULTICAST SUPPORT FOR DUAL STACK-LITE AND INTERNET PROTOCOL VERSION SIX RAPID DEPLOYMENT ON INTERNET PROTOCOL VERSION FOUR INFRASTRUCTURES

(75) Inventor: Behcet Sarikaya, Wylie, TX (US)

(73) Assignee: Futurewei Technologies, Inc., Plano, TX (US)

( * ) Notice: Subject to any disclaimer, the term of this patent is extended or adjusted under 35 U.S.C. 154(b) by 122 days.

(21) Appl. No.: 13/347,649

(22) Filed: Jan. 10, 2012

(65) Prior Publication Data

US 2012/0218910 A1    Aug. 30, 2012

Related U.S. Application Data

(60) Provisional application No. 61/447,192, filed on Feb. 28, 2011.

(51) Int. Cl.
*H04J 3/14*    (2006.01)
*H04L 12/28*    (2006.01)

(52) U.S. Cl.
USPC ........... 370/252; 370/352; 370/254; 370/312; 370/338; 370/389; 370/390; 370/392

(58) Field of Classification Search
CPC ....... H04L 12/185; H04L 45/16; H04L 12/18; H04L 12/189; H04L 45/02; H04L 63/1458; H04L 12/1836; H04L 12/66; H04L 43/0817; H04L 29/12028; H04L 29/12839; H04L 45/04; H04L 47/15; H04L 61/103; H04L 65/407; H04W 80/04

USPC ......... 370/252, 352, 390, 401, 432, 254, 312, 370/392, 338, 389; 709/227, 225, 223, 224, 709/249
See application file for complete search history.

(56) References Cited

U.S. PATENT DOCUMENTS

| 1,771,539 | A | 7/1930 | Jandus |
|---|---|---|---|
| 7,701,937 | B2 | 4/2010 | Narayanan et al. |
| 8,392,593 | B1 | 3/2013 | Wadhwa et al. |
| 2002/0026525 | A1 | 2/2002 | Armitage |
| 2002/0181465 | A1 | 12/2002 | Tsuchiya et al. |

(Continued)

OTHER PUBLICATIONS

"Automatic IP Multicast Without Explicit Tunnels (AMT)", Thaler et al., Mar. 2010.*

(Continued)

*Primary Examiner* — Un C Cho
*Assistant Examiner* — Oussama Roudani
(74) *Attorney, Agent, or Firm* — Conley Rose, P.C.; Grant Rodolph; Brandt D. Howell

(57) ABSTRACT

A method implemented by a network apparatus comprising receiving a Multicast Listener Discovery (MLD) membership report message from a host, sending an Automatic IP Multicast Tunneling (AMT) Relay discovery message comprising an anycast address for a border relay (BR) via an IPv4 network, receiving an AMT Relay advertisement message comprising a unicast address for the BR via the IPv4 network, sending an AMT request message to the BR via an AMT tunnel, receiving an AMT query message comprising a MLD listener query from the BR via the AMT, sending an AMT membership message comprising the MLD membership report message of the host to the BR via the AMT tunnel, and receiving an AMT multicast data message comprising an encapsulated IPv6 multicast message from the BR via the AMT tunnel.

10 Claims, 9 Drawing Sheets

(56) References Cited

U.S. PATENT DOCUMENTS

| | | |
|---|---|---|
| 2005/0015507 A1 | 1/2005 | Chin |
| 2006/0050643 A1 | 3/2006 | Yoshimoto et al. |
| 2007/0008966 A1 | 1/2007 | Santhanam et al. |
| 2008/0151808 A1 | 6/2008 | O'Neill |
| 2008/0175239 A1 | 7/2008 | Sistanizadeh et al. |
| 2009/0109859 A1 | 4/2009 | Rahman et al. |
| 2010/0014519 A1 | 1/2010 | Fernandez Gutierrez |
| 2011/0090815 A1 | 4/2011 | Gundavelli et al. |
| 2011/0286470 A1 | 11/2011 | Dec et al. |
| 2011/0307629 A1 | 12/2011 | Haddad |
| 2012/0102188 A1 | 4/2012 | Shah et al. |
| 2013/0558336 | 3/2013 | Wadhwa et al. |

OTHER PUBLICATIONS rfc4605, Fenner et al. "IGMP/MLD Proxying", Aug. 2006.*
rfc5969, Townsley et al. "IPv6 Rapid Deployment on IPv4 Infrastructures (6rd)", Aug. 2010.*
"Support for Multicast over 6to4 Networks", Thaler D., Jul. 2000.*
Chirstensen, et al., "Considerations for Internet Group Management Protocol (IGMP) and Multicast Listener Discovery (MLD) Snooping Switches," RFC 4541, May 2006, 17 pages.
Haberman, et al., "Multicast Router Discovery," RFC 4286, Dec. 2005, 18 pages.
Armitage, et al, "IPv6 Over Non-Broadcast Multiple Access (NBMA) Networks," RFC 2491, Jan. 1999, 44 pages.
Thaler, et al., "Automatic IP Multicast Tunneling," draft-ietf-mboned-auto-multicast-11.txt, Jul. 2011, 37 pages.
Thaler, et al., "Automatic IP Multicast Tunneling," draft-ietf-mboned-auto-multicast-10.txt, Mar. 2010, 40 pages.
Bradner, "Key Words for Use in RFCs to Indicate Requirement Levels," BCP 14, RFC 2119, Mar. 1997, 3 pages.
Rose, "Writing I-Ds and RFCs Using XML," RFC 2629, Jun. 1999, 29 pages.
Fenner, et al., Internet Group Management Protocol (IGMP) / Multicast Listener Discovery (MLD)-Based Multicast Forwarding ("IGMP/MLD Proxying"), RFC 4605, Aug. 2006, 12 pages.
Vida, et al., "Multicast Listener Discovery Version 2 (MLDv2) for IPv6," RFC 3810, Jun. 2004, 58 pages.
Cain, et al., "Internet Group Management Protocol, Version 3," RFC 3376, Oct. 2002, 53 pages.
Despres, "IPv6 Rapid Deployment on IPv4 Infrastructures (6rd)" RFC 5569, Jan. 2010, 10 pages.
Townsley, et al., "IPv6 Rapid Deployment on IPv4 Infrastructures (6rd)—Protocol Specification," RFC 5969, Aug. 2010, 18 pages.
Conta, et al., "Generic Packet Tunneling in IPv6 Specification," RFC 2473, Dec. 1998, 36 pages.
Nordmark, et al., "Basic Transition Mechanisms for IPv6 Hosts and Routers," RFC 4213, Oct. 2005, 26 pages.
Durand, et al., "Dual-Stack Lite Broadband Deployments Following IPv4 Exhaustion," draft-ietf-softwire-dual-stacklite-06.txt, Aug. 2010, 35 pages.
Durand, "Dual-Stack Lite Broadband Deployments Following IPv4 Exhaustion," RFC 6333, Aug. 2011, 32 pages.
Schmidt, et al., Base Deployment for Multicast Listener Support in PMIPv6 Domains, draft-ietf-multimob-pmipv6-basesolution-07.txt, Dec. 2010, 22 pages.
Schmidt, et al., "Base Deployment for Multicast Listener Support in PMIPv6 Domains," RFC 6224, Apr. 2011, 19 pages.
Carpenter, B., et al., "Connection of IPv6 Domains via IPv4 Clouds," RFC 3056, Feb. 2001, 26 pages.
Deering, S., et al., "Internet Protocol, Version 6 (IPv6) Specification," RFC 2460, Dec. 1998, 42 pages.
"Technology Overview, Configuring Dual-Stack Lite for IPv6 Access," Juniper Networks, Release 104, Nov. 5, 2010, 20 pages.
"Address Family Transition Router—AFTR," ISC, UKNOF 16, London, UK, Apr. 22, 2010, 25 pages.
Durand, Ed., A., "Dual-Stack Lite Broadband Deployments Following IPv4 Exhaustion," draft-ietf-softwire-dual-stack-lite-05, Jul. 10, 2010, 36 pages.
Office Action dated Oct. 4, 2013, 47 pages, U.S. Appl. No. 13/347,652, filed on Jan. 10, 2012.
Krishnan, S., et al., "The Line Identification Destination Option," draft-ietf-6man-lineid-00.txt, Dec. 17, 2010, 13 pages.
Krishnan, S., et al., "The Line Identification Destination Option," draft-ietf-6man-lineid-02.txt, Oct. 31, 2011, 14 pages.
Li, X., et al., "IP/ICMP Translation Algorithm," draft-ietf-behave-v6v4-xlate-23.txt, Sep. 18, 2010, 34 pages.
Wang, Q., et al., "Multicast Extensions to DS-Lite Technique in Broadband Deployments," draft-ietf-softwire-dslite-multicast-01.txt, Oct. 31, 2011, 18 pages.
Wang Q., et al., "Multicast Extensions to DS-Lite Technique in Broadband Deployments," draft-qin-softwire-dslite-multicast-02.txt, Jan. 7, 2011, 20 pages.
Albanna, Z., et al., "IANA Guidelines for IPv4 Multicast Address Assignments," RFC 3171, Aug. 2001, 9 pages.
Bao, C., et al., "IPv6 Addressing of IPv4/IPv6 Translators," RFC 6052, Oct. 2010, 19 pages.
Fenner, B., et al., "Protocol Independent Multicast—Sparse Mode (PIM-SM): Protocol Specification (Revised)," RFC 4601, Aug. 2006, 151 pages.
Li, X., et al., "IP/ICMP Translation Algorithm," RFC 6145, Apr. 2011, 34 pages.
Notice of Allowance dated Apr. 21, 2014, 32 pages, U.S. Appl. No. 13/347,652, filed on Jan. 10, 2012.

* cited by examiner

MULTICAST SUPPORT FOR DUAL STACK-LITE AND INTERNET PROTOCOL VERSION SIX RAPID DEPLOYMENT ON INTERNET PROTOCOL VERSION FOUR INFRASTRUCTURES

CROSS-REFERENCE TO RELATED APPLICATIONS

The present application claims the benefit of U.S. Provisional Patent Application No. 61/447,192 filed Feb. 28, 2011 by Behcet Sarikaya and entitled "Multicast Support for Dual-Stack Lite and Internet Packet Version Six Rapid Deployment," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol version 6 (IPv6) is a version of the Internet Protocol (IP). IPv6 is designed to succeed IP version 4 (IPv4). The Internet operates by transferring data between hosts in packets that are independently routed across networks as specified by an international communications protocol known as IP. Each host or computer on the Internet requires an IP address in order to communicate. The growth of the Internet has created a need for more addresses than are possible with IPv4. IPv6 was developed by the Internet Engineering Task Force (IETF) to deal with this long-anticipated IPv4 address exhaustion, and is described in Internet standard document Request for Comment (RFC) 2460, published in December 1998, which is incorporated herein by reference. Similar to IPv4, IPv6 is an Internet Layer protocol for packet-switched internetworking and provides end-to-end datagram transmission across multiple IP networks. While IPv4 allows 32 bits for an IP address, and can therefore support up to $2^{32}$ (4,294,967,296) addresses, IPv6 uses 128-bit addresses, so the new address space supports $2^{128}$ (approximately 3.4× $10^{38}$) addresses. This expansion allows for many more devices and users on the internet as well as extra flexibility in allocating addresses and efficiency for routing traffic. It also eliminates the primary need for network address translation (NAT), which gained widespread deployment as an effort to alleviate IPv4 address exhaustion.

SUMMARY

In one embodiment, the disclosure includes a method implemented by a network apparatus comprising receiving a Multicast Listener Discovery (MLD) membership report message from a host, sending an Automatic IP Multicast Tunneling (AMT) Relay discovery message comprising an anycast address for a border relay (BR) via an IPv4 network, receiving an AMT Relay advertisement message comprising a unicast address for the BR via the IPv4 network, sending an AMT request message to the BR via an AMT tunnel, receiving an AMT query message comprising a MLD listener query from the BR via the AMT, sending an AMT membership message comprising the MLD membership report message of the host to the BR via the AMT tunnel, and receiving an AMT multicast data message comprising an encapsulated IPv6 multicast message from the BR via the AMT tunnel.

In another embodiment, the disclosure includes an apparatus comprising a memory comprising computer readable instructions that when implemented by a processor cause the processor to receive a MLD membership report message from a host, send an AMT Relay discovery message comprising an anycast address for a BR via an IPv4 network, receive an AMT Relay advertisement message comprising a unicast address for the BR via the IPv4 network, send an AMT request message to the BR via an AMT tunnel, receive an AMT query message comprising a MLD listener query from the BR via the AMT, send an AMT membership message comprising the MLD membership report message of the host to the BR via the AMT tunnel, and receive an AMT multicast data message comprising an encapsulated IPv6 multicast message from the BR via the AMT tunnel.

In another embodiment, the disclosure includes a method implemented by a network apparatus comprising receiving a MLD membership report message from a host, sending an IPv4 message comprising an anycast address for a BR via an IPv4 network, receiving a second IPv4 message comprising a unicast address for the BR via the IPv4 network, sending an aggregated membership report message to the BR via an IPv6 in IPv4 tunnel established with the BR across the IPv4 network, and receiving an encapsulated IPv6 multicast message for an IPv6 group from the BR via the IPv6 in IPv4 tunnel.

In another embodiment, the disclosure includes an apparatus comprising a memory comprising computer readable instructions that when implemented by a processor cause the processor to receive a MLD membership report message from a host, send an IPv4 message comprising an anycast address for a BR via an IPv4 network, receive a second IPv4 message comprising a unicast address for the BR via the IPv4 network, send an aggregated membership report message to the BR via an IPv6 in IPv4 tunnel established with the BR across the IPv4 network, and receive an encapsulated IPv6 multicast message for an IPv6 group from the BR via the IPv6 in IPv4 tunnel.

In another embodiment, the disclosure includes an apparatus comprising a customer edge (CE) coupled to a BR across an IPv4 network and to a plurality of hosts, wherein the CE comprises an AMT Gateway function, wherein the AMT Gateway function at the CE interacts with an AMT Relay function at the BR to establish an AMT tunnel where an IPv6 packet is encapsulated in a User Datagram Protocol (UDP) header between the CE and the BR across the IPv4 network, and wherein the AMT tunnel is used to send multicast IPv6 traffic across the IPv4 network to the host.

In another embodiment, the disclosure includes an apparatus comprising a CE coupled to a BR across an IPv4 network and to a plurality of hosts, wherein the CE comprises a MLD Proxy function, wherein the MLD Proxy function at the CE interacts with a MLD Querier function at the BR to establish an IPv6 in IPv4 tunnel between the CE and the BR across the IPv4 network, and wherein the IPv6 in IPv4 tunnel is used to send multicast IPv6 traffic across the IPv4 network to the host.

In another embodiment, the disclosure includes a network component comprising a receiver at a BR configured to receive an aggregated membership report message from a CE across an IPv4 network that requests joining an IPv6 group on behalf of a host of the CE, a processor configured to establish an IPv6 in IPv4 tunnel with the CE, add a corresponding entry in a multicast membership database, and duplicate multicast IPv6 traffic received from an IPv6 network based on the multicast membership database, and a transmitter configured to send the multicast IPv6 traffic to the CE via the IPv6 in IPv4 tunnel.

In another embodiment, the disclosure includes a method implemented by a network apparatus comprising receiving an Internet Group Management Protocol (IGMP) membership report message from a host, sending an aggregated membership report message to an Address Family Transition Router (AFTR) via an IPv4 in IPv6 tunnel established with the AFTR across an IPv6 network, receiving an IGMP query message from the AFTR via the IPv4 in IPv6 tunnel, and receiving an encapsulated IPv4 multicast message for an IPv4 group from the AFTR via the IPv4 in IPv6 tunnel.

In another embodiment, the disclosure includes an apparatus comprising a memory comprising computer readable instructions that when implemented by a processor cause the processor to receive an IGMP membership report message from a host, send an aggregated membership report message to an AFTR via an IPv4 in IPv6 tunnel established with the AFTR across an IPv6 network, receive an IGMP query message from the AFTR via the IPv4 in IPv6 tunnel, and receive an encapsulated IPv4 multicast message for an IPv4 group from the AFTR via the IPv4 in IPv6 tunnel.

In another embodiment, the disclosure includes an apparatus comprising a Basic Bridging Broadband element (B4) coupled to an AFTR across an IPv6 network and to a plurality of hosts, wherein the B4 comprises an IGMP Proxy function, wherein the IGMP Proxy function at the B4 interacts with an IGMP Querier function at the AFTR to establish an IPv4 in IPv6 tunnel between the B4 and the AFTR across the IPv6 network, and wherein the IPv4 in IPv6 tunnel is used to send multicast IPv4 traffic across the IPv6 network to the host.

In yet another embodiment, the disclosure includes a network component comprising a receiver at an AFTR configured to receive an aggregated membership report message from a B4 across an IPv6 network that requests joining an IPv4 group on behalf of a host of the B4, a processor configured to establish an IPv4 in IPv6 tunnel with the B4 and add a corresponding entry in a multicast membership database, and a transmitter configured to send the multicast IPv4 traffic to the B4 via the IPv4 in IPv6 tunnel.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
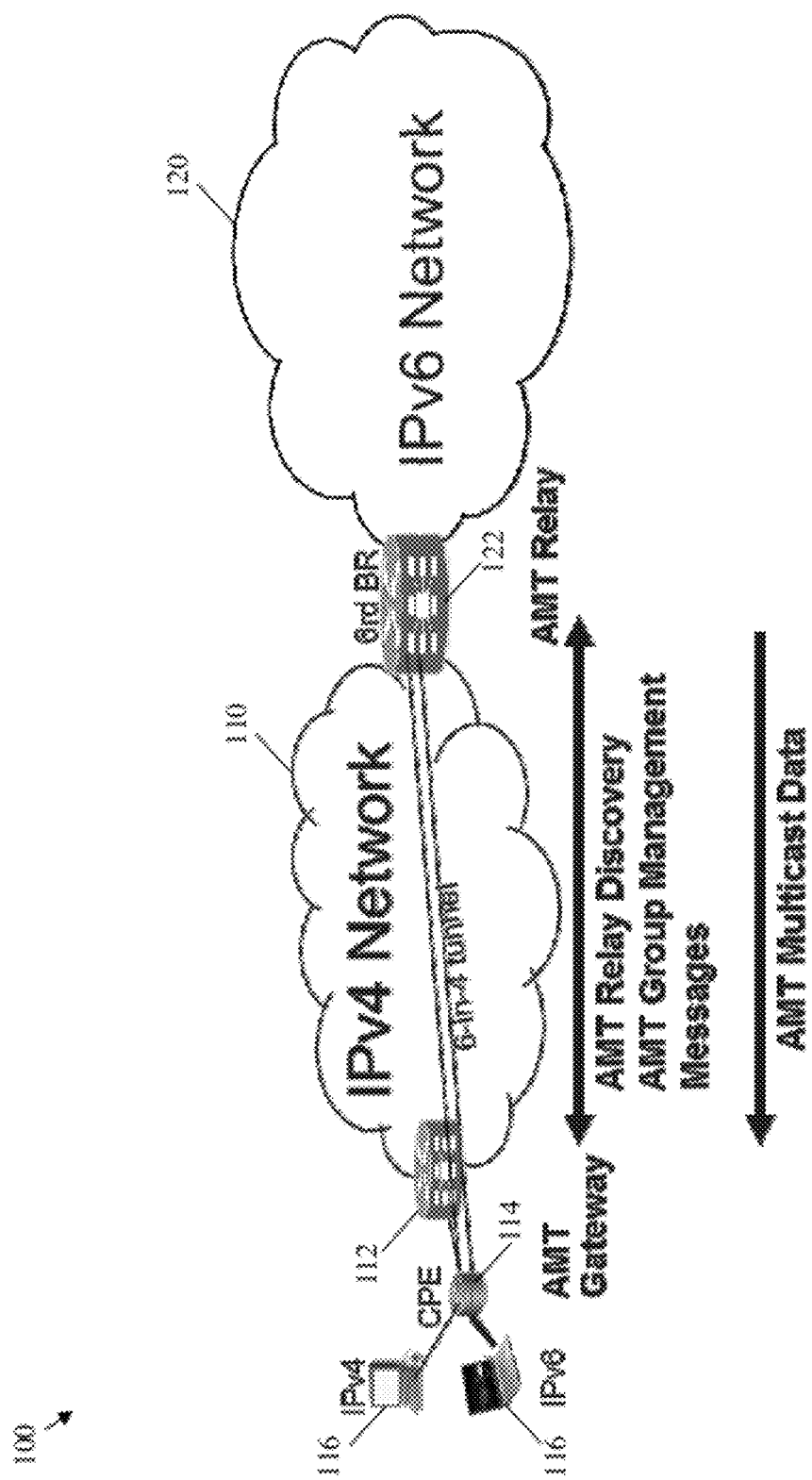
FIG. 1 is a schematic diagram of an embodiment of an IPv6 Rapid Deployment on IPv4 Infrastructures (6rd) AMT multicast architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

With IPv4 address depletion, multiple techniques are being standardized for IPv6 migration including DS-Lite as described in RFC 6333 and 6rd as described in RFC 5969, both of which are incorporated herein by reference. 6rd may enable IPv6 hosts to communicate with external hosts using IPv4 only legacy Internet Service Provider (ISP) network. A 6rd CE device may be coupled to a Local Area Network (LAN) side that is dual stack (supports both IPv6 and IPv4) and to a Wide Area Network (WAN) that is IPv4 only. The CE may tunnel IPv6 packets received from the LAN to a 6rd BRs after encapsulating IPv6 packets in IPv4 packets. The BRs may have anycast IPv4 addresses and receive the encapsulated packets from CEs over a virtual interface. The 6rd operation may be stateless, where packets may be received/sent independent of each other and no state may be maintained. 6rd as defined in RFC 5969 and RFC 5569, which is incorporated herein by reference, is unicast only and may not support multicast.

DS-Lite may enable IPv4 hosts to communicate with external hosts using IPv6 only network and may move the NAT function to the network. A B4 element may be coupled to a LAN that is dual stack and to a WAN side that is IPv6 only. The B4 may tunnel IPv4 packets received from the LAN to an AFTR after encapsulating IPv4 packets in IPv6 packets. The AFTR may decapsulate the packets, implement a NAT operation, and then send the packets out to an IPv4 public Internet. DS-Lite as defined in RFC 6333 may be unicast only and may not support multicast.

A multicast enabling technique is AMT. AMT is a scheme that may enable hosts in an AMT site to connect to an AMT Relay, which may be a multicast router in a multicast infrastructure, e.g., as described in the IETF publication draft-ietf-mboned-auto-multicast-11 by D. Thaler et al., July 2011, entitled "Automatic IP Multicast Tunneling," which is incorporated herein by reference. The network between the AMT site and the AMT Relay may not be multicast enabled and may be treated as a non-broadcast multi-access (NBMA) link layer, e.g., as described in RFC 2491, which is incorporated herein by reference.

When an AMT Gateway receives a MLD join message to an Any-Source Multicast (ASM) or Source-Specific Multicast (SSM) group, the AMT Gateway may discover an AMT Relay using anycast Relay IP addresses. Using a three-way handshake, the AMT Gateway may send a MLD membership report message in a UDP tunnel, also referred to herein as an AMT tunnel, to the AMT Relay. The AMT Relay may then join the source in the multicast infrastructure and send multicast data downstream to a plurality of member gateways in the UDP tunnel. When an AMT Gateway has no membership state, e.g., after member hosts leave the group(s), the AMT Gateway's state with the AMT Relay may expire and the AMT Gateway may restart relay discovery. The AMT Relay and AMT Gateway may exchange AMT Query and AMT Membership Update messages, e.g., periodically. AMT control messages may be secured using message authentication codes. AMT may be used for both IPv4 using IGMP and IPv6 using MLD. IGMP messages may be encapsulated in IPv4 using UDP encapsulation, and MLD messages may be encapsulated in IPv6 using UDP encapsulation.

Disclosed herein are systems and methods to support multicast for IPv6 hosts in 6rd. IPv4 multicast may also be supported for IPv4 hosts. The systems may use IPv6 and IPv4 multicast addressing and may not require new multicast address prefixes to be allocated, such as IPv4-embedded IPv6 multicast addresses. The 6rd systems comprise a 6rd AMT multicast scheme, where an AMT Gateway at a 6rd CE may use an AMT protocol to establish a tunnel interface with an AMT Relay at a 6rd BR. The tunnel may be used to exchange MLD messages to establish a multicast state at the AMT Relay. Thus, the AMT Relay may tunnel IPv6 multicast data to IPv6 hosts that may be coupled to the AMT Gateway. The 6rd systems also comprise a 6rd Proxy multicast scheme that may be based on proxying a MLD protocol at a 6rd CE and then tunneling MLD messages to a 6rd BR, where IPv6 multicast routing may be supported. Multicast data received at the 6rd BR may be tunneled to the 6rd CE and then delivered to the host. IPv4 multicast and IGMP may be supported in a similar manner. The 6rd systems also comprise a 6rd Layer 2 multicast based scheme.

Also disclosed herein are systems and methods to support multicast for IPv4 hosts in DS-Lite. IPv6 multicast may also be supported for IPv6 hosts. The DS-Lite scheme may be based on a DS-Lite B4 that may proxy an IGMP and then tunnel IGMP messages to a DS-Lite AFTR. IPv4 multicast data received at the AFTR may be tunneled to the B4 and then delivered to the host. IPv6 multicast and MLD may be supported in a similar manner. The DS-Lite systems also comprise a Layer 2 multicast based scheme.

FIG. 1 illustrates an embodiment of a 6rd AMT multicast architecture 100, which may support multicast for IPv6 hosts across an IPv4 network. The 6rd AMT multicast architecture 100 may comprise an IPv4 network 110, one or more CEs 112 coupled to the IPv4 network 110, a customer premise equipment (CPE) 114 coupled to a corresponding CE 112, a plurality of hosts 116 coupled to the CPE 114, an IPv6 network 120 coupled to the IPv4 network 110, and one or more BRs 122 positioned between the IPv4 network 110 and the IPv6 network 120. The components of the 6rd AMT multicast architecture 100 may be arranged as shown in FIG. 1.

The IPv4 network 110 may be any IPv4 only network configured to transfer IPv4 packets but not IPv6 packets, e.g., based on any network technology. For instance, the IPv4 network 110 may correspond to the Internet or a portion of the Internet. Alternatively, the IPv4 network 110 may be an Ethernet network, a LAN, a WAN, any IP capable network, or combinations thereof. The CE 112 may be any device, component, or node, e.g., located at the edge of the IPv4 network 110, that is configured to enable communications between the IPv4 network 110 and external components and/or networks. For example, the CE 112 may be an edge router, edge bridge, edge gateway, or edge switch.

The CPE 114 may be any device, component, or node located outside the IPv4 network 110 (e.g., at a customer site) and configured to enable the CE 112 to communicate with the hosts 116. The hosts 116 may be any customer devices or component (e.g., e.g., at the customers' homes/offices) that may be used to establish communications. For instance, the hosts 116 may comprise personal communications devices/portable communication devices, such as laptop computers, desktop computers, computer tablets, smartphones, and/or other similar devices. The hosts 116 may comprise IPv4 only hosts configured to exchange only IPv4 packets and/or IPv6 dual stack hosts configured to exchange both IPv6 and IPv4 packets, or combinations thereof, which may be served by the CE 112 (via the CPE 114). Further, the hosts 116 that may be IPv6 dual stack hosts may be configured to join multicast groups in IPv6 and receive multicast data, e.g., via the IPv4 network 110. The IPv6 multicast groups may comprise ASM groups, SSM groups, or both. Based on the 6rd protocol, the CE 112 may be dual stack (supports both IPv4 and IPv6 packets) on the side facing the hosts 116 and may be IPv4 only (supports only IPv4 packets) on the side facing the IPv4 network 110.

The IPv6 network 120 may be any IPv6 network configured to transfer IPv6 packets, e.g., based on any network technology. For instance, the IPv6 network 120 may correspond to the Internet or a portion of the Internet. Alternatively, the IPv6 network 120 may be an Ethernet network, a LAN, a WAN, any IP capable network, or combinations thereof. The BR 122 may be a 6rd BR, e.g., located at the border of the IPv6 network 120, that is configured to allow communications between the IPv4 network 110 and the IPv6 network 120. The BR 122 may receive encapsulated IPv6 in IPv4 packets from the IPv4 network 110, decapsulate the packets, and send the IPv6 packets to the IPv6 network 120. The BR 122 may also encapsulate and forward IPv6 packets from the IPv6 network 120 to the IPv4 network 110.

Typically, unicast in 6rd may be stateless. As such, each IPv6 packet sent by the CE 112 may be treated separately and different packets from the same CE 112 may be sent to different BRs 122. The CE 112 may encapsulate IPv6 packets in IPv4 packets and set the packets' destination addresses to the BRs' 122 addresses, which may be anycast IPv4 addresses. The BRs 122 may be placed where IPv6 native connectivity exists. The CE 112 may be configured with a 6rd Prefix, e.g., corresponding to an ISP, and with the BR's 122 IPv4 address. Each host 116 may be assigned a prefix which may comprise the 6rd Prefix and the host's 116 IPv4 prefix. The BR 122 may receive an IPv6 packet (e.g., from the IPv6 network 120) that is addressed to the ISP and may extract the destination host's 116 IPv4 address from the destination address in the packet. The BR 122 may use the extracted address as a destination address, encapsulate the IPv6 packet in an IPv4 packet, and send the packet to the IPv4 network 110. The 6rd protocol or scheme may treat the IPv4 network 110 as an NBMA link from the IPv6 network's 120 point of view and the CEs 112 and BRs 122 may be defined as off-link neighbors from one other.

In the 6rd AMT multicast architecture 100, hosts 116 that may be IPv6 dual stack hosts coupled to the CE 112 may be configured as AMT sites and may be multicast enabled. The IPv4 network 110 may be a unicast only network and the BR 122 may be coupled to a native multicast backbone infrastructure. The CE 112 may comprise an AMT Gateway and may serve the connected hosts 116. To handle multicast traffic, the CE 112 may comprise an AMT pseudo-interface that may serve as a default multicast router and may be a tunneling interface. The BR 122 may comprise an AMT Relay that may also comprise a pseudo-interface. The AMT Relay and the CEs 112, which may be AMT gateways, coupled to the AMT Relay may be considered to be on a logical NBMA link. On this link, the AMT Gateways and the AMT Relay may communicate using the AMT protocol to transmit and receive multicast control messages for membership management and multicast data from the AMT Relay to the AMT Gateways. The CEs 112 may support AMT gateways and the BRs 122 may support the AMT gateways as described in draft-ietf-mboned-auto-multicast-11.

Typically, the AMT protocol may be implemented to provide IPv6 multicast to the hosts 116 in AMT site(s) using AMT messages in IPv6 networks. Alternatively, the AMT protocol may be implemented to provide IPv4 multicast to the hosts 116 in AMT site(s) using AMT messages in IPv4 networks. However, in the 6rd AMT multicast architecture 100, the IPv4 network 110 may be an IPv4 only network. Thus, the IPv4 network 110 may be configured to use the AMT protocol to transmit IPv6 multicast messages, such as MLD messages, and IPv6 multicast data. Specifically, when a host 116 (an IPv6 host) wants to join an IPv6 multicast group, the host 116 may send a MLD Membership Report message, e.g., MLD version two (MLDv2) report for a source-specific group, to the corresponding CE 112. The CE 112 may use one of 6rdBRIPv4Address values, which may be an anycast address of a BR 122 that the CE 112 may be configured with, as an address to send an AMT Relay Discovery IPv4 message. The CE 112 may send the AMT Relay Discovery IPv4 message, which may be a UDP message, to an Internet Assigned Numbers Authority (IANA) reserved AMT port, e.g., port number 2268. The CE 112 may set a MLD (M) bit or flag in the message to indicate that the CE 112 may encapsulate MLD messages in IPv4 packets.

The BR 122, which may be topologically the closest BR to the CE 112, may receive the message from the CE 112. The BR 122 may then determine whether the BR 122 may provide an IPv6 multicast service. If the BR 122 may provide an IPv6 multicast service, the BR 122 may reply to the CE 112 using an AMT Relay Advertisement message. The BR 122 may set a "M" bit in the message to indicate that the BR 122 may provide an IPv6 multicast service. The CE 112 may receive the AMT Relay Advertisement message, and hence obtain the BR's 122 unicast address, which the CE 112 may use to send multicast packets for this session. The CE 112 may send an AMT Request message to the BR's 122 unicast address to begin the process of joining an IPv6 multicast group. The CE 112 may initialize a timer, which may be used to send periodic requests.

The BR 122 may send an AMT Query message, e.g., after the AMT Relay Advertisement message. The AMT Query message may comprise a MLD Listener Query message that may be encapsulated with an IP header, e.g., as described in draft-ietf-mboned-auto-multicast-11. The CE 112 may receive the AMT Query message and respond by sending an AMT Membership Update message. The AMT Membership Update message may comprise a MLD Membership Report message, which may be encapsulated with an IP header, to request the BR 122 to join the IPv6 multicast group that the host 116 wants to join. The BR 122 may receive the AMT Membership Update message and add a tunnel to the CE 112 in an outgoing interface list for the group that the host 116 wants to join. The BR 122 may send a join message towards the source of the multicast group to build a multicast tree in the native multicast Infrastructure (e.g., in the IPv6 network 120). After the three-way handshake involving the AMT Relay Discovery, AMT Relay Advertisement, and AMT Request message, the AMT Membership Query and AMT Membership Update messages may be exchanged, e.g., periodically, between the BR 122 and the CE 112.

The multicast data packets received from the source at the BR 122 may be replicated to a plurality of interfaces in the BR's 122 outgoing interface list and in the tunnel outgoing interface for member CEs 112. The BR 122 may send multicast data in an AMT Multicast Data message to the CE 112, where the data packet may be encapsulated in UDP packet with an IP header. The CE 112 may receive the AMT Multicast Data message over the pseudo-interface associated with the tunnel to the BR 122. The CE 112 may then forward the data packet to the outgoing interfaces joined by the hosts 116. If another host 116 wants to join another IPv6 multicast group, the three-way handshake described above may be used, but the AMT Relay Discovery and AMT Relay Advertisement messages may not be needed.

Additionally, IPv4 multicast may be supported in a manner similar to the IPv6 multicast scheme described above. The CE 112 may comprise an AMT Gateway function with no extensions, e.g., as described in draft-ietf-mboned-auto-multicast-11. The hosts 116 that may be IPv4 hosts may exchange IGMP messages with the AMT Gateway, e.g., as described in RFC 3376, which is incorporated herein by reference. The AMT Gateway may use the AMT protocol to subscribe the multicast groups via an AMT Relay at the BR 122. Thus, the AMT Relay may send IPv4 multicast data in UDP encapsulated IPv4 messages to the AMT Gateway.

Figure 2:
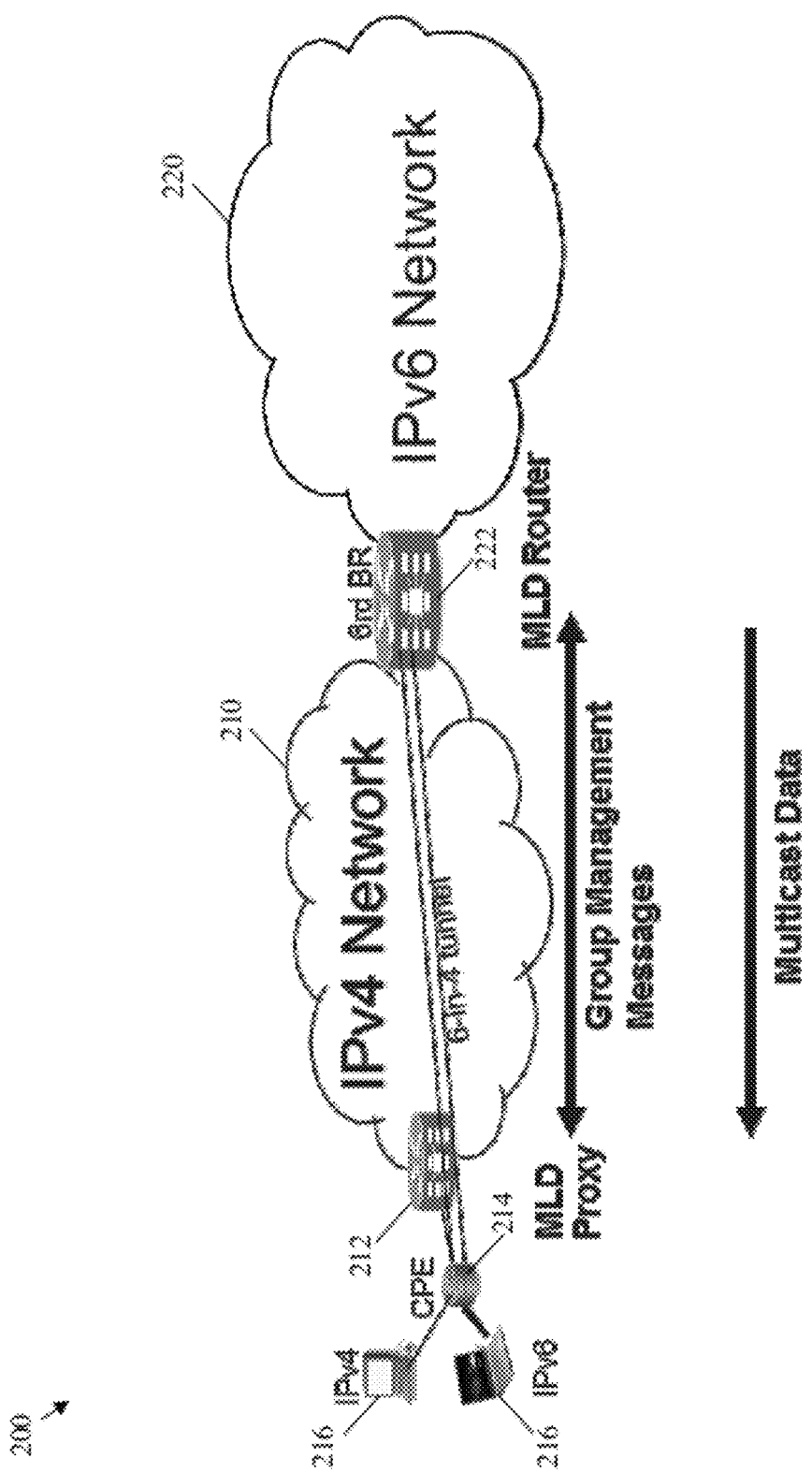
FIG. 2 is a schematic diagram of an embodiment of a 6rd Proxy multicast architecture.

FIG. 2 illustrates an embodiment of a 6rd Proxy multicast architecture 200, which may support multicast for IPv6 hosts across an IPv4 network. The 6rd Proxy multicast architecture 200 may comprise an IPv4 network 210, one or more CEs 212 coupled to the IPv4 network 210, a CPE 214 coupled to a corresponding CE 212, a plurality of hosts 216 coupled to the CPE 214, an IPv6 network 220 coupled to the IPv4 network 210, and one or more BRs 222 positioned between the IPv4 network 210 and the IPv6 network 220. The components of the 6rd AMT multicast architecture 200 may be similar to the corresponding components of the 6rd AMT multicast architecture 100 and may be arranged as shown in FIG. 2.

The CE 212 may be configured to implement a MLD Proxy function, e.g., as described in RFC 4605, which is incorporated herein by reference. The hosts 216 that may be IPv6 hosts may send their join requests, e.g., in MLD Membership Report messages, to the CE 212. Hence, the CE 212 as a proxy may send aggregated Report messages upstream towards the BR 222. In case of supporting SSM, the hosts 216 (e.g., IPv6 hosts), CE 212, and BR 222 may support MLDv2. The BR 222 may be configured as a default multicast querier (MLD Querier) for the CE 212. The BR 222 may implement a multicast router function or may be a second MLD proxy.

The 6rd Proxy multicast architecture 200 may allow the hosts 216 (e.g., IPv6 hosts) to subscribe and receive IPv6 multicast data from the IPv6 network 220 via the IPv4 network 210. Specifically, the host 216 may send their subscription requests for IPv6 multicast groups upstream to the CE 212, which may be a default router. After subscribing the group, the host 216 may receive multicast data from the CE 212. The host 216 may implement the host part of the MLD protocol and the CE 212 may behave as a MLD Proxy. After receiving a MLD Report message for requesting subscription to an IPv6 multicast group, the CE 212 may establish a tunnel interface with the BR 222. The CE 212 may encapsulate a MLD Membership Report message in an IPv6 in IPv4 tunnel and send an IPv4 message to the BR's 222 IPv4 anycast address (6rdBRIPv4Address), e.g., as described in RFC 5969. The tunnel may be IPv4 based but may carry IPv6 traffic, MLD messages in both directions, and IPv6 multicast data messages downstream. The CE 212 may get a unicast IPv4 address of the BR 222 from a reply comprising a MLD message encapsulated in IPv4, and may then use the BR's 222 unicast address, e.g., as long as any multicast state exists.

The CE 212 operation may be similar to, but simpler than, the operation described in RFC 6224, which is incorporated herein by reference. In 6rd environment, there may be no requirement to handle host mobility. The CE 212 may not have to maintain more than one tunnel interface, and a single interface may be sufficient. The MLD Proxy at the CE 212 may not have more than one proxy instance and a single instance may be sufficient. The CE 212 may be a MLD proxy that maintains a MLD proxy membership database. The CE 212 may insert a multicast forwarding state on the incoming interface, and merge state updates into the MLD proxy membership database. The CE 212 may update or remove elements from the database as required. The CE 212 may then send an aggregated Report via the upstream tunnel to the BR 222 when the membership database changes.

The CE 212 may answer MLD queries from the BR 222 based on the membership database. The CE's 212 downstream link may follow the typical multipoint channel forwarding and may not pose specific problems. The CE 212 may receive IPv6 multicast data from the BR 222 that may be tunneled over the tunnel interface. The CE 212 may decapsulate the received packet and then forward it downstream. Each member host may receive the data packet based on a Layer 2 multicast interface and no packet duplication may be necessary. The BR 222 may act as the default multicast querier (MLD Querier) for a plurality of CEs 212, which may have established an IPv4 tunnel with the BR 222. To maintain a consistent multicast state between the CE 212 and the BR 222, once connected, the CE 212 may stay connected until the state becomes empty. Subsequently, the CE 212 may establish another tunnel to a different BR 222.

According to aggregated MLD reports received from a CE 212, the BR 222 may establish group/source-specific multicast forwarding states at corresponding downstream tunnel interfaces. Subsequently, the BR 222 may maintain or remove the states as required by the aggregated reports received from the CE 212. At the upstream interface, the BR 222 may procure aggregated multicast membership maintenance. Based on the multicast-transparent operations of the CEs 212, the BR 222 may treat its tunnel interfaces as multicast enabled downstream links, e.g., serving one or more listening nodes. Multicast traffic arriving at the BR 222 may be transparently forwarded according to the BR's 222 multicast forwarding information base. Multicast data may be first replicated and then forwarded in an IPv6 in IPv4 tunnel from the BR 222 to the corresponding CE 212. The IPv6 in IPv4 tunneling described above may be implemented as described in RFC 4213, which is incorporated herein by reference. Considerations described in RFC 5969 may also apply. The packets transported upstream from the CE 212 may carry only MLD signaling messages and may not be subject to fragmentation. However, packets transported downstream, e.g., multicast data to the CE 212, may be subject to fragmentation.

Additionally, IPv4 multicast may be supported in a manner similar to the IPv6 multicast scheme described above. The CE 212 may comprise an IGMP Proxy function, e.g., as described in RFC 3376 and RFC 4605. The CE 212 may receive IGMP join requests from the hosts 216 and then send aggregated IGMP Report messages upstream in an IPv4 in IPv4 tunnel. The tunnel addressing may be in IPv4, e.g., as described in RFC 5969. A multicast membership database may be maintained for active IPv4 multicast groups to which the hosts 216 subscribe. The BR 222 may be an IGMP Querier or a second IGMP Proxy. The BR 222 may serve a plurality of CEs 212 downstream and treat corresponding tunnel interfaces as multicast enabled downstream links, e.g., serving one or more listening nodes. The multicast membership database may be maintained based on the aggregated Reports received from downstream tunnel interfaces. The IPv4 multicast data received from the multicast SSM and/or ASM sources may be replicated according to the multicast membership database, and the data packets may be tunneled to the CEs 212, which may have one or more members of the multicast group. The CEs 212 may receive multicast data upstream in the CE-BR tunnel, decapsulate the received packet data, and then forward the packet downstream. Thus, each member host 216 may receive IPv4 multicast data packets from a corresponding Layer 2 interface.

In another embodiment, a 6rd Layer 2 multicast based scheme or architecture may be used to support multicast for IPv6 hosts across an IPv4 network. Layer 2 multicast may be supported in the network to forward multicast data downstream to the ports of Layer 2 devices, e.g., switches that request a multicast group, instead of flooding the data to all the ports. In such switches, also referred to as snooping switches, multicast Media Access Control (MAC) address based filters may be set up with link Layer 2 multicast groups to the egress ports. When a MLD Report message is received, the switch may set up a multicast filter entry that allows (in case of a join message) or prevents (in case of a leave message) packets to flow to the port on which the MLD Report message was received. In terms of IP multicast addresses, the mapping may not be unique, e.g., about $2^{80}$ IPv6 multicast addresses may be mapped to a single Ethernet multicast MAC address. This mapping may be reduced to about 32, e.g., if allocation policy of using only the lower 32 bits in a 112-bit group identifier (ID) field of an IPv6 multicast address is followed.

The snooping switches may maintain a list of multicast routers and the ports on which they are attached may be router ports. For this purpose, a multicast router discovery protocol described in RFC 4286, which is incorporated herein by reference, may be used. The switch may send an Internet Control Message Protocol version 6 (ICMPv6) Multicast Router Solicitation message and the router may send an ICMPv6 Multicast Router Advertisement message in reply. One function of the snooping switch may be to forward multicast data packets based on the filters that are set up, e.g., to the egress ports with multicast groups downstream and to the router ports.

In a 6rd network, the snooping switches may detect MLD packets in a tunnel between a CE 212 and a BR 222, e.g., as described in the architectures above. This may require IPv6 snooping switches to be capable of reading IPv4 protocol field values. For instance, a value of about 58 may indicate that an ICMPv6 packet is encapsulated. A value of about 41 may indicate that an IPv6 data packet is encapsulated. The fact that MLD packets are ICMPv6 packets may complicate the operation of the snooping switch. The switch may need to look further into the packet to correctly identify a MLD packet. In case multicast is supported in Layer 2, the BR may not attempt to replicate a received multicast data packet. The packet replication may be handled by the snooping switches. The Layer 2 multicast support may avoid packet duplication at the BR, which may have substantial cost in some cases.

Figure 3:
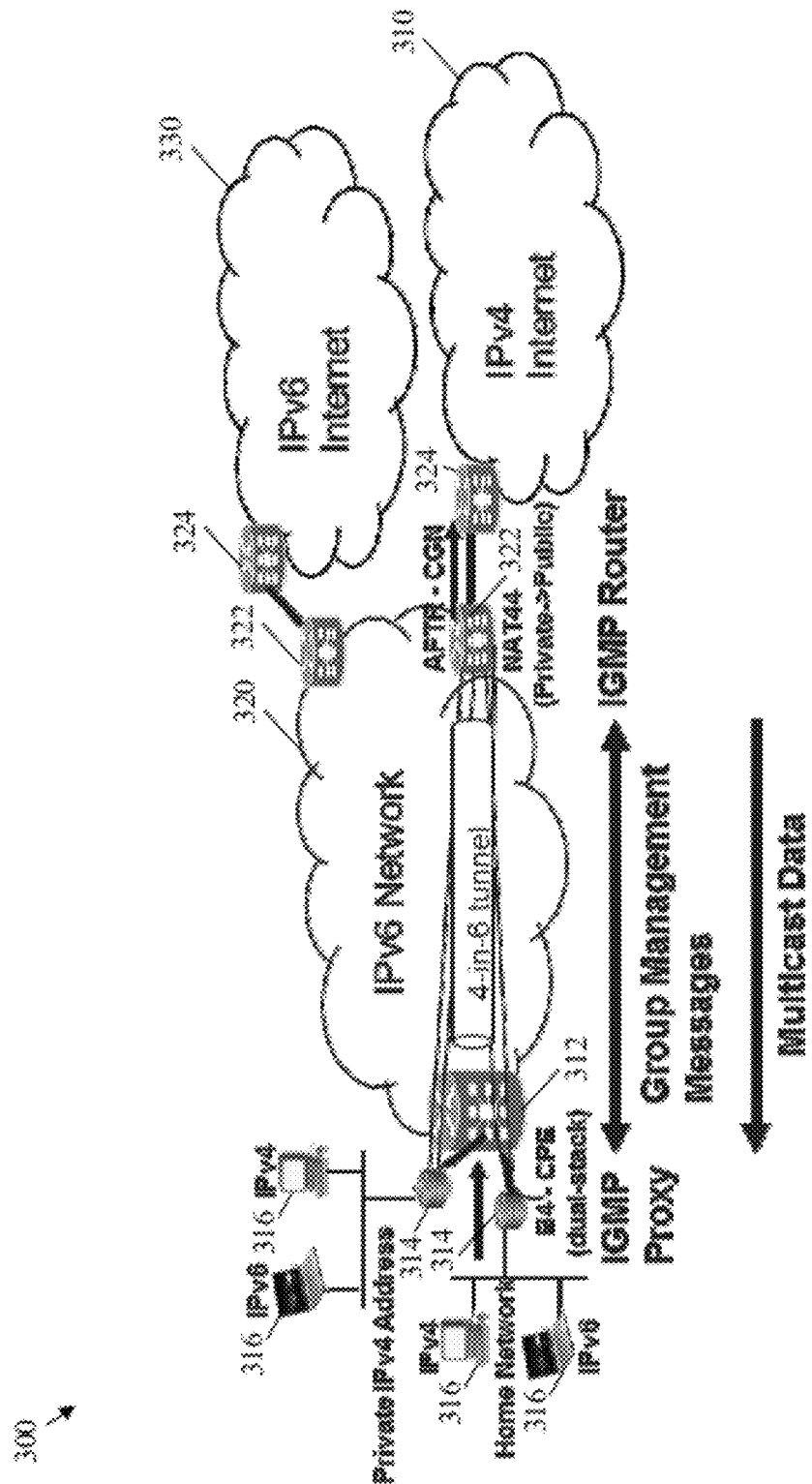
FIG. 3 is a schematic diagram of an embodiment of a Dual Stack-Lite (DS-Lite) multicast architecture.

FIG. 3 illustrates an embodiment of a DS-Lite multicast architecture 300, which may support multicast for IPv4 hosts across an IPv6 network. The DS-Lite multicast architecture 300 may comprise an IPv6 network 320, one or more B4s 312 coupled to the IPv6 network 320, one or more CPEs 314 coupled to corresponding B4s 312, a plurality of hosts 316 coupled to corresponding CPEs 314, an IPv4 network 310 coupled to the IPv6 network 320, and one or more AFTRs 322 positioned between the IPv6 network 320 and the IPv4 network 310. Additionally, the DS-Lite multicast architecture 300 may comprise a second IPv6 network 330 that may be coupled to the IPv6 network 320. The second IPv6 network 330, and similarly the IPv4 network 310, may each comprise an edge node 324 (e.g., a Carrier-grade NAT (CGN)) that may be coupled to a corresponding AFTR 322. The components of the DS-Lite multicast architecture 300 may be arranged as shown in FIG. 3.

The hosts 316 may comprise IPv4 hosts and/or IPv6 dual stack hosts that may be served by the B4 312. The B4 312 may be dual stack on the side facing the hosts 316 and IPv6 only on the side facing the IPv6 network 320, e.g., a WAN. At the other boundary of the IPv6 network 320, the AFTR 322 may receive IPv4 packets, which may be tunneled in IPv6 packets from the B4 312, decapsulate the packets, and send the packets out to the IPv4 network 310. To support multicast, the B4 312 may implement an IGMP Proxy function, e.g., as described in RFC 4605. The hosts 316 that may be IPv4 hosts may send their join requests, which may be IGMP Membership Report messages, to the B4 312. The B4 312 may be a proxy that sends aggregated Report messages upstream towards the AFTR 322. The AFTR 322 may be a default multicast querier (IGMP Querier) for the B4 312. The AFTR 322 may implement a multicast router function or may be a second IGMP proxy.

The DS-Lite multicast architecture 300 may allow the hosts 316 to subscribe and receive IPv4 multicast data from IPv4 content providers (e.g., the IPv4 network 310). The hosts 316 may send their subscription requests for IPv4 multicast groups upstream to the B4 312, which may be a default router. After subscribing to the group, the hosts 316 may receive multicast data from the B4 312. The host 316 may implement a host part of the IGMP protocol. The B4 312 may be an IGMP Proxy. After receiving an IGMP Report message for requesting subscription to an IPv4 multicast group, the B4 312 may establish a tunnel interface with an AFTR 322. The tunnel may be IPv6-based and may carry IP traffic and IGMP messages in both directions and IPv4 multicast data messages downstream. The operation of the B4 312 may be similar to the operation described in RFC 6224, but may be simpler. In the DS-Lite architecture 300 there may be no requirement to handle host mobility. The B4 312 may not have to maintain more than one tunnel interface and a single interface may be sufficient. An IGMP Proxy at the B4 312 may not have more than one proxy instance and a single instance may be sufficient.

The B4 312 may be an IGMP proxy that maintains an IGMP proxy membership database. The B4 312 may insert a multicast forwarding state on the incoming interface and merge state updates into the IGMP proxy membership database. The B4 312 may update or remove elements from the database as required. The B4 312 may then send an aggregated Report via the upstream tunnel to the AFTR 322, e.g., when the membership database changes. The B4 312 may answer IGMP queries from the AFTR 322 based on the membership database. The B4's 312 downstream link may follow the typical multipoint channel forwarding and may not pose specific problems.

The B4 312 may receive IPv4 multicast data from the AFTR 322 that may be tunneled over the tunnel interface. The B4 312 may decapsulate the packet and then forward the packet downstream. Each member host 316 may receive the data packet based on Layer 2 multicast interface and packet duplication may not be necessary. The AFTR 322 may act as the default multicast querier (IGMP Querier) for a plurality of B4s 312 that may establish an IPv6 tunnel with the AFTR 322. To keep a consistent multicast state between the B4 312 and the AFTR 322, once connected, the B4 312 may stay connected until the state becomes empty. The B4 312 may then continue to use the tunnel for IPv4 unicast traffic.

According to an aggregated IGMP report received from the B4 312, the AFTR 322 may establish group/source-specific multicast forwarding states at corresponding downstream tunnel interfaces. The AFTR 322 may then maintain or remove the states as required by the aggregated reports received from the B4 312. At the upstream interface, the AFTR 322 may procure for aggregated multicast membership maintenance. Based on the multicast-transparent operations of the B4s 312, the AFTR 322 may treat corresponding tunnel interfaces as multicast enabled downstream links, e.g., serving zero to multiple listening nodes. Multicast traffic arriving at the AFTR 322 may be transparently forwarded according to its multicast forwarding information base. Multicast data may be first replicated and then forwarded in an IPv4 in IPv6 tunnel from the AFTR 322 to the corresponding B4 312. Legacy IPv4 in IPv6 tunneling may be implemented as in RFC 2473, which is incorporated herein by reference. Considerations specified in RFC 6333 may also apply. Packets transported upstream from the B4 312 may carry only IGMP signaling messages and may not be subject to fragmentation. However packets transported downstream, e.g., multicast data to the B4 312, may be subject to fragmentation.

Additionally, IPv6 multicast may be supported in a manner similar to the IPv4 multicast scheme described above. The B4 312 may comprise a MLD Proxy function, e.g., as described in RFC 3810, which is incorporated herein by reference, and RFC 4605. The B4 312 may receive MLD join requests from the hosts 316 and then send aggregated MLD Report messages upstream in an IPv6 in IPv6 tunnel. The tunnel addressing may be in IPv6, e.g., as described in RFC 6333. A multicast membership database may be maintained for a plurality of active IPv6 multicast groups to which the hosts 316 subscribe.

The AFTR 322 may be a MLD querier or a second MLD Proxy. The AFTR 322 may serve a plurality of B4s 312 downstream and treat corresponding tunnel interfaces as multicast enabled downstream links, e.g., serving one or more listening nodes. A multicast membership database may be maintained based on the aggregated Reports received from downstream tunnel interfaces. IPv6 multicast data received from the multicast SSM and/or ASM sources may be replicated according to the multicast membership database and the data packets may be tunneled to the B4s 312, which may have one or more members of the multicast group. The B4s 312 may receive multicast data upstream in the B4-AFTR tunnel, decapsulate the data packets, and then forward the packets downstream. Each member host 316 (e.g., IPv6 host) may receive IPv6 multicast data packets from a corresponding Layer 2 interface.

In another embodiment, a DS-Lite Layer 2 multicast based scheme or architecture may be used to support multicast for IPv4 hosts across an IPv6 network. Layer 2 multicast may be supported in the network to forward multicast data downstream to the ports of Layer 2 devices, e.g., switches that request a multicast group, instead of flooding the data to all the ports. In such switches, also referred to as snooping switches, multicast MAC address based filters may be set up with link Layer 2 multicast groups to the egress ports. When an IGMP Report message is received, the switch may set up a multicast filter entry that allows (in case of a join message) or prevents (in case of a leave message) packets to flow to the port on which the IGMP Report message was received. In terms of IP multicast addresses, the mapping may not be unique, e.g., about 32 IPv4 multicast addresses may be mapped to a single Ethernet multicast MAC address.

The snooping switches may maintain a list of multicast routers, and the ports on which they are attached may be router ports. A multicast router discovery protocol described in RFC 4286, which is incorporated herein by reference, may be used for this purpose. The switch may send an IGMP Multicast Router Solicitation message and the router may send an IGMP Multicast Router Advertisement message in reply. One function of the snooping switch may be to forward multicast data packets based on the filters that are set up, e.g., to the egress ports with multicast groups downstream and to the router ports.

In a DS-Lite network, the snooping switches may detect IGMP packets in a tunnel between a B4 and an AFTR, e.g., as described in the DS-Lite multicast architecture 300. This may require IPv4 snooping switches to be capable of reading IPv6 next header values. For instance, a value of about 2 may indicate that an IGMP packet is encapsulated. A value of about 4 may indicate that an IPv4 data packet is encapsulated. The switch may operate its snooping on such types of packets. In case multicast is supported in Layer 2, the AFTR may not attempt to replicate a received multicast data packet. The packet replication may be handled by the snooping switches. The Layer 2 multicast support may avoid packet duplication at the AFTR, which may have substantial cost in some cases.

Figure 4:
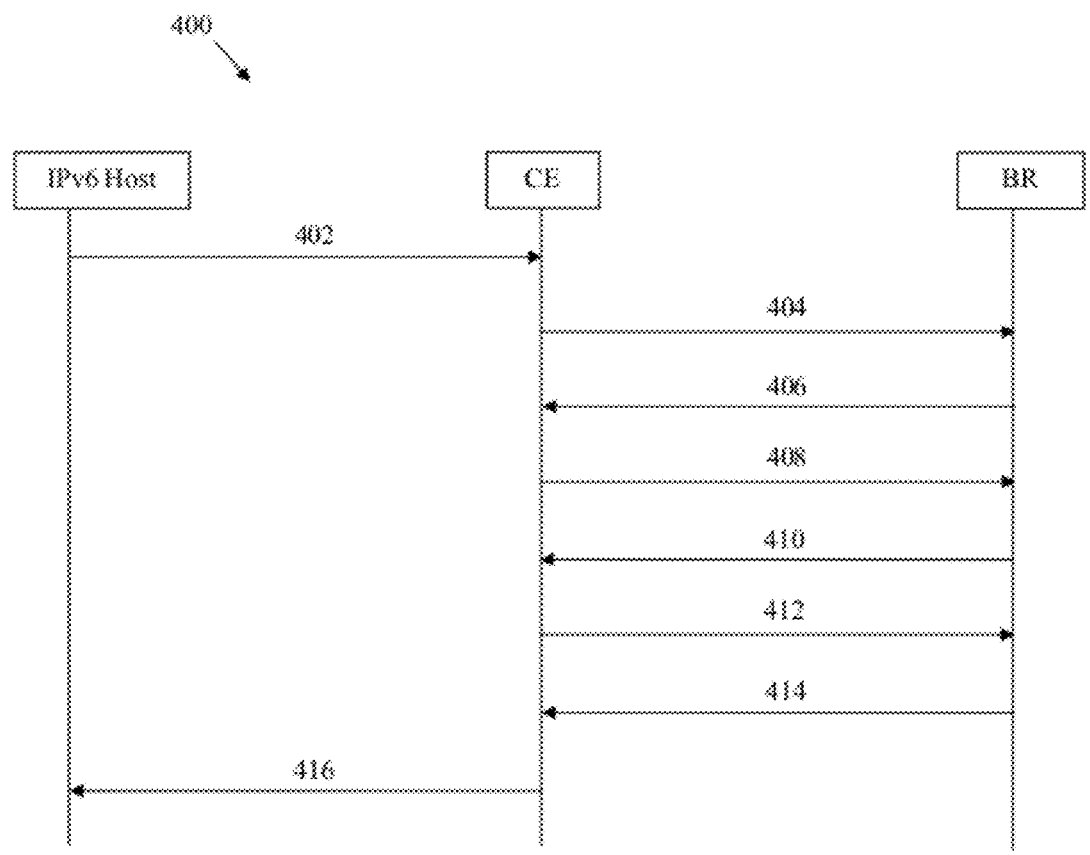
FIG. 4 is a protocol diagram of an embodiment of a 6rd AMT multicast method.

FIG. 4 illustrates an embodiment of a 6rd AMT multicast method 400, which may be implemented in the 6rd AMT multicast architecture 100. The 6rd AMT multicast method 400 may be implemented using an IPv6 host, a corresponding CE, and an associated BR, which may correspond to the components of the 6rd AMT multicast architecture 100. The 6rd AMT multicast method 400 may be used to enable multicast for IPv6 hosts across an IPv4 network. The method 400 may begin at step 402, where the IPv6 host may send a MLD Membership Report message to the CE (e.g., via a CPE) to join an IPv6 group, e.g., in an IPv6 network. The MLD Membership Report message may be sent in a UDP tunnel (or an AMT tunnel) to the CE. The CE may serve as an AMT Relay configured to establish an AMT IPv6 in IPv4 tunnel with an AMT Gateway function at the BR across an IPv4 network coupled to the IPv6 network.

At step 404, the CE may send an AMT Relay Discovery message across the IPv4 network. The AMT Relay Discovery message may comprise an anycast address of the BR and may be a UDP message sent via an IANA reserved AMT port. The AMT Relay Discovery message may also comprise an M bit that may be set to indicate that the CE may encapsulate MLD messages in IPv4 packets. The AMT Relay Discovery message may be received by the closest BR, which may be positioned between the IPv4 network and the IPv6 network. At step 406, the BR may send an AMT Relay Advertisement message to the CE. The AMT Relay Advertisement message may advertise the unicast address of the BR and may comprise an M bit that may be set indicate that the BR may provide an IPv6 multicast service. At step 408, the CE may send an AMT Request message to the BR to begin the process of joining the IPv6 group requested by the IPv6 host.

At step 410, the BR may return an AMT Query message to the CE. The AMT Query message may comprise a MLD Listener Query. At step 412, the CE may respond to the BR by sending an AMT Membership Update message. The AMT Membership Update message may comprise the MLD Membership Report message from the IPv6 host and may request the BR to join the IPv6 multicast group. The BR may receive the AMT Membership Update message and add a tunnel to the CE in an outgoing interface list for the IPv6 group that the host wants to join. At step 414, the BR may send an AMT Multicast Data message to the CE that comprises the IPv6 multicast data from the IPv6 network. The multicast data packets received from the IPv6 network may be replicated at the BR to a plurality of interfaces in the BR's outgoing interface list and in the tunnel outgoing interface for member CEs. The CE may receive the AMT Multicast Data message over a pseudo-interface associated with the tunnel to the BR. The AMT messages exchanged between the CE and BR may be UDP messages. At step 416, the CE may decapsulate the multicast data packets in the AMT Multicast Data message and send the multicast data packets to the corresponding IPv6 host(s). The multicast data packets may be forwarded to the outgoing interfaces joined by the IPv6 host(s). The method 400 may then end.

Figure 5:
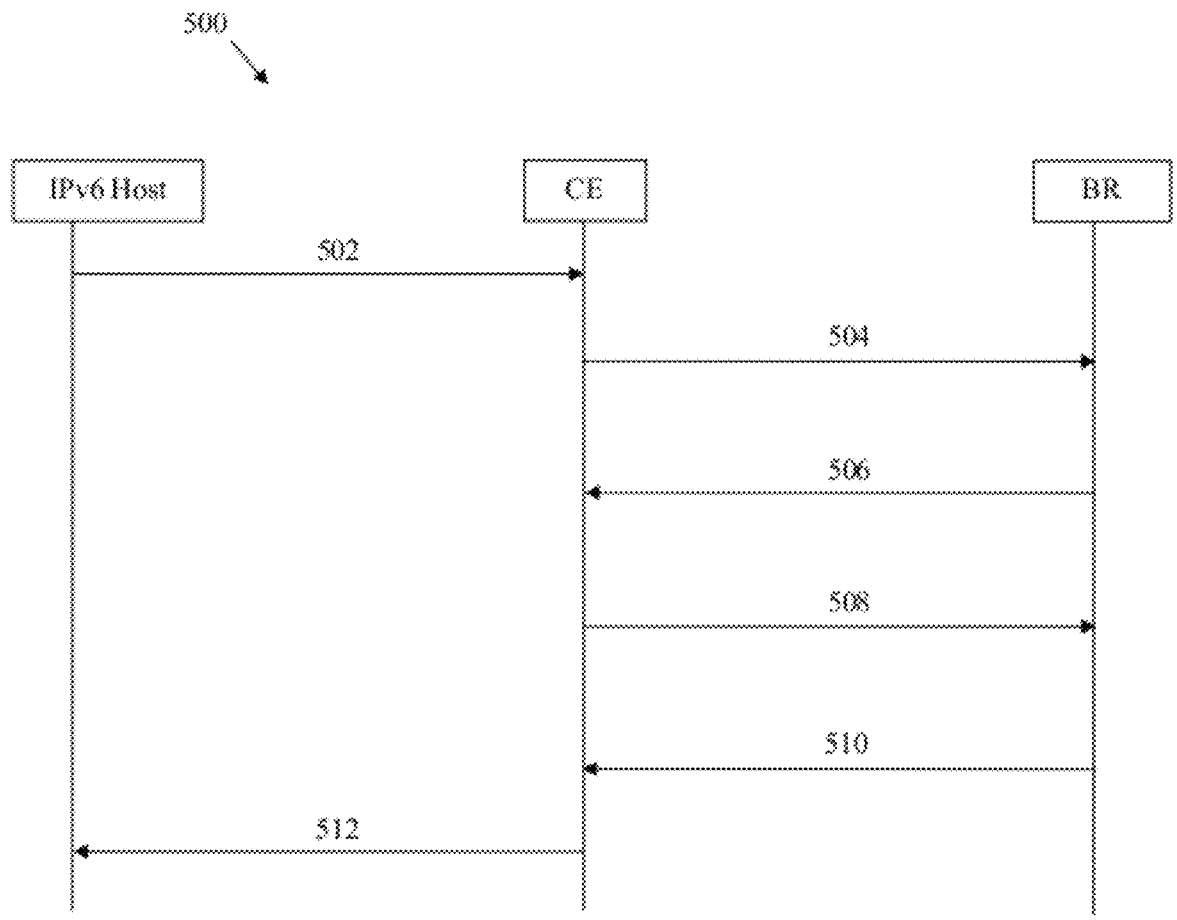
FIG. 5 is a protocol diagram of an embodiment of a 6rd Proxy multicast method.

FIG. 5 illustrates an embodiment of a 6rd Proxy multicast method 500, which may be implemented in the 6rd Proxy multicast architecture 200. The 6rd Proxy multicast method 500 may be implemented using an IPv6 host, a corresponding CE, and an associated BR, which may correspond to the components of the 6rd Proxy multicast architecture 200. The 6rd Proxy multicast method 500 may be used to enable multicast for IPv6 hosts across an IPv4 network. The method 500 may begin at step 502, where one or more IPv6 hosts may send joint MLD Membership Report messages to the CE (e.g., via a CPE) to join an IPv6 group, e.g., in an IPv6 network. The CE may serve as a MLD proxy configured to establish an IPv6 in IPv4 tunnel with a MLD Querier function at the BR across an IPv4 network coupled to the IPv6 network.

At step 504, the CE may establish a tunnel interface with the BR, encapsulate the MLD Membership Report message in an IPv4 message, and send the IPv4 message in the tunnel to an anycast address for the BR. At step 506, the BR may send the CE a unicast IPv4 address of the BR in a reply comprising a MLD message encapsulated in IPv4. At step 508, the CE may send aggregated Membership Report messages to the BR to request joining the IPv6 group on behalf of the IPv6 hosts. At step 510, the BR may send encapsulated multicast messages that comprise the IPv6 multicast data from the IPv6 network to the CE. The multicast data packets received from the IPv6 network may be replicated at the BR to a plurality of interfaces in the BR's outgoing interface that correspond to member CEs. The CE may receive the encapsulated multicast messages over the interface associated with the tunnel to the BR. At step 512, the CE may decapsulate the multicast data packets in the received multicast messages and send the multicast data packets to the corresponding IPv6 host(s). Each IPv6 host may receive the multicast data packets via a Layer 2 multicast interface with the CE. The method 500 may then end.

Figure 6:
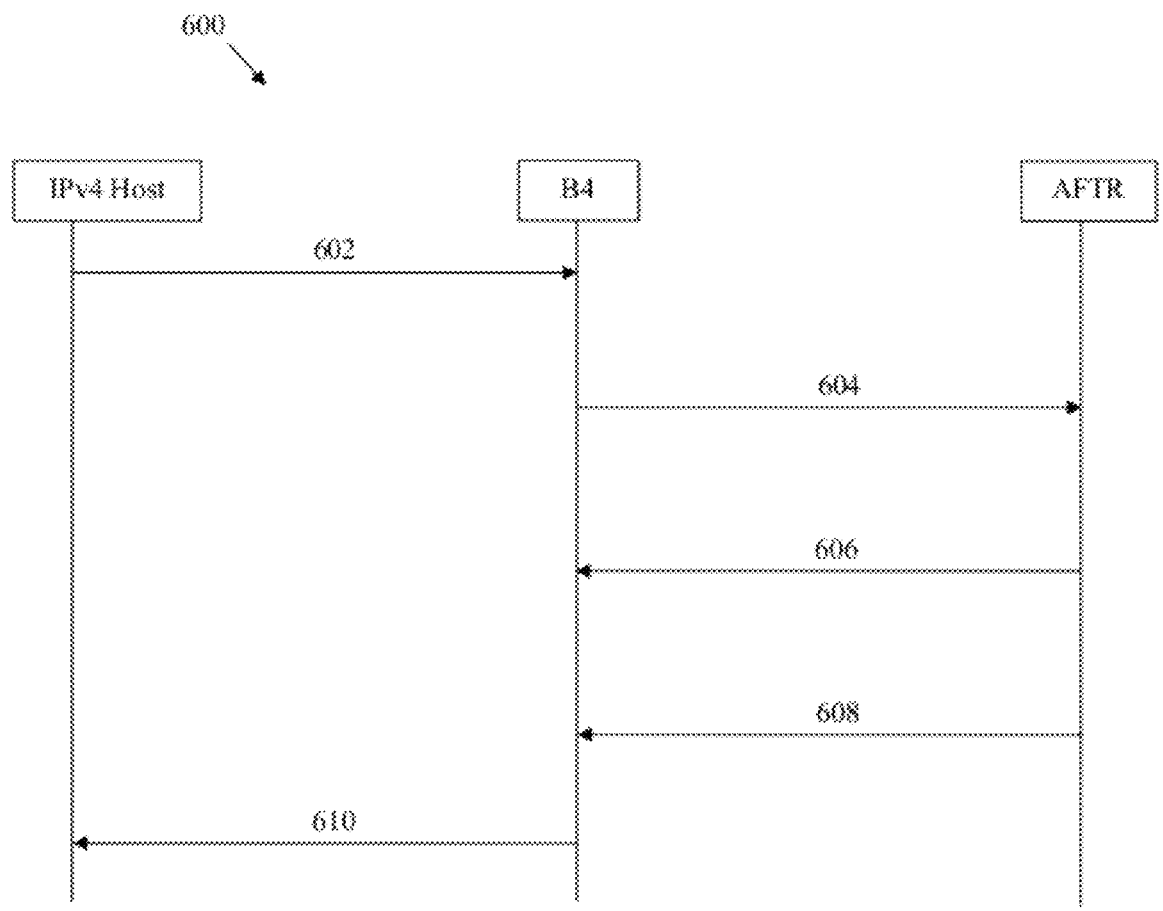
FIG. 6 is a protocol diagram of an embodiment of a DS-Lite multicast method.

FIG. 6 illustrates an embodiment of a DS-Lite multicast method 600, which may be implemented in the DS-Lite multicast architecture 300. The DS-Lite multicast method 600 may be implemented using an IPv4 host, a corresponding B4, and an associated AFTR, which may correspond to the components of the DS-Lite multicast architecture 300. The DS-Lite multicast method 600 may be used to enable multicast for IPv4 hosts across an IPv6 network. The method 600 may begin at step 602, where one or more IPv4 hosts may send joint IGMP Membership Report messages to the B4 (e.g., via a CPE) to join an IPv4 group, e.g., in an IPv4 network. The B4 may serve as an IGMP proxy configured to establish an IPv4 in IPv6 tunnel with an IGMP Querier function at the AFTR across an IPv6 network coupled to the IPv4 network.

At step 604, the B4 may send aggregated Membership Report messages to the AFTR to request joining the IPv4 group on behalf of the IPv4 hosts. At step 606, the AFTR may return an IGMP Query message to the B4. At step 608, the AFTR may send encapsulated multicast messages that comprise the IPv4 multicast data from the IPv4 network to the B4. The multicast data packets received from the IPv4 network may be replicated at the AFTR and then forwarded in the IPv4 in IPv6 tunnel from the AFTR to the corresponding B4(s). The B4 may receive the encapsulated multicast messages over the interface associated with the tunnel to the AFTR. At step 610, the B4 may decapsulate the multicast data packets in the received multicast messages and send the multicast data packets to the corresponding IPv4 host(s) via a Layer 2 multicast interface. The method 600 may then end.

Figure 7:
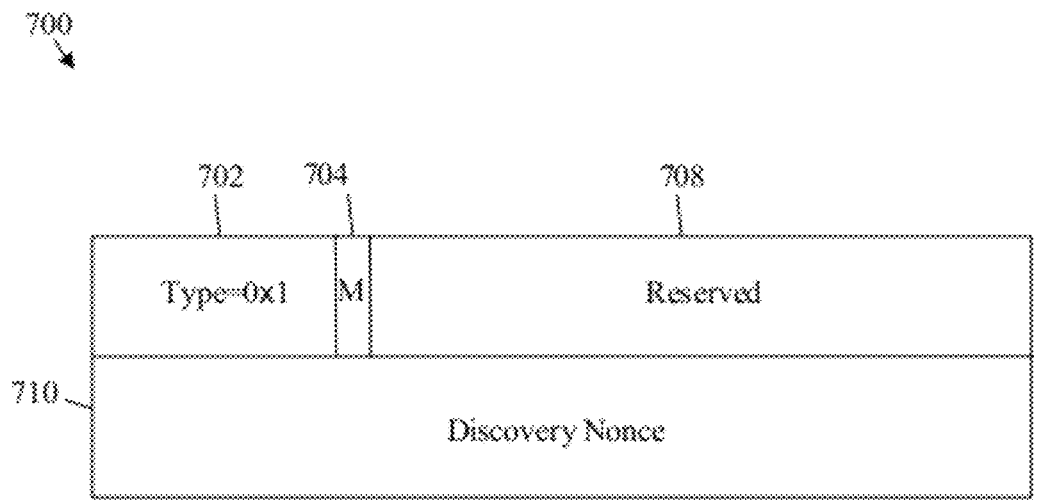
FIG. 7 is a schematic diagram of an embodiment of an AMT Relay Discovery message.

FIG. 7 illustrates an embodiment of an AMT Relay Discovery message 700, which may be used in the 6rd AMT multicast architecture 100 and the 6rd AMT multicast method 400. The AMT Relay Discovery message 700 may comprise a Type field 702, an M bit or flag 704, an IGMP (I) bit or flag 706, a Reserved field 708, and a Discovery Nonce field 710. The Type field 702, Reserved field 708, and Discovery Nonce field 710 may be configured similar to the corresponding fields of the AMT Relay Discovery message described in draft-ietf-mboned-auto-multicast-11. The M flag 704 may be used by an AMT Gateway (e.g., the CE 112) to negotiate MLD message transmission in an IPv4 network.

The Type field 702 may comprise a value (e.g., of about eight bits) that indicates the type of the AMT Relay Discovery message 700. The type value may be set to 0×1. The M flag 704 may comprise about one bit that may be set (e.g., to about one) if the AMT Gateway may send MLD messages that are encapsulated in IPv4. The Reserved field 708 may comprise about 22 bits that may be reserved and not used. The bits in the Reserved field 708 may be set to about zero upon transmission and ignored upon reception. The Discovery Nonce field 710 may comprise a random value (e.g., of about 32 bits) that may be generated by the AMC Gateway and replayed by a corresponding AMC Relay (e.g., the BR 122).

Figure 8:
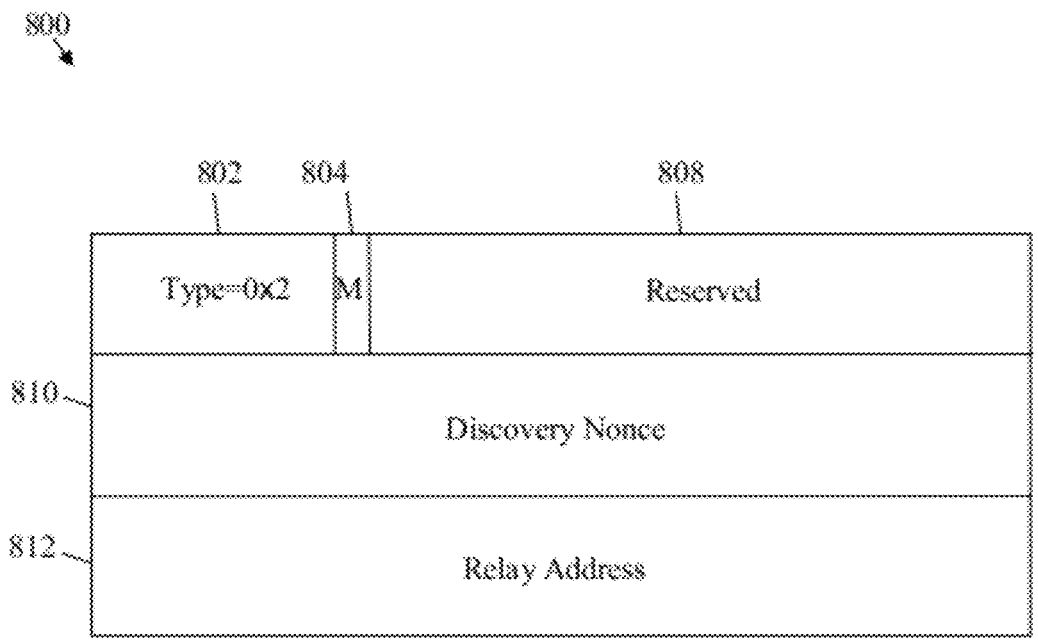
FIG. 8 is a schematic diagram of an embodiment of an AMT Relay Advertisement message.

FIG. 8 illustrates an embodiment of an AMT Relay Advertisement message 800, which may be used in the 6rd AMT multicast architecture 100 and the 6rd AMT multicast method 400. The AMT Relay Advertisement message 800 may comprise a Type field 802, an M bit or flag 804, an I bit or flag 806, a Reserved field 808, a Discovery Nonce field 810, and a Relay Address filed 812. The Type field 802, Reserved field 808, Discovery Nonce field 810, and Relay Address filed 812 may be configured similar to the corresponding fields of the AMT Relay Advertisement message described in draft-ietf-mboned-auto-multicast-11. The M flag 804 may be used by an AMT Relay (e.g., the BR 122) to indicate if the AMT Relay is capable of MLD message transmission in an IPv4 network. The Type field 802 may comprise a value (e.g., of about eight bits) that indicates the type of the AMT Relay Advertisement message 800. The type value may be set to 0×2. The M flag 804 may comprise about one bit that may be set (e.g., to about one) if the AMT Relay may send MLD messages that are encapsulated in IPv4. The Reserved field 808 may comprise about 22 bits that may be reserved and not used. The bits in the Reserved field 808 may be set to about zero upon transmission and ignored upon reception. The Discovery Nonce field 810 may comprise a random value (e.g., of about 32 bits) that may be generated by the AMC Gateway and replayed by a corresponding AMC Relay (e.g., the BR 122). The Relay Address field 812 may comprise a unicast IPv4 address of the AMT Relay, which may be about 32 bits.

Figure 9:
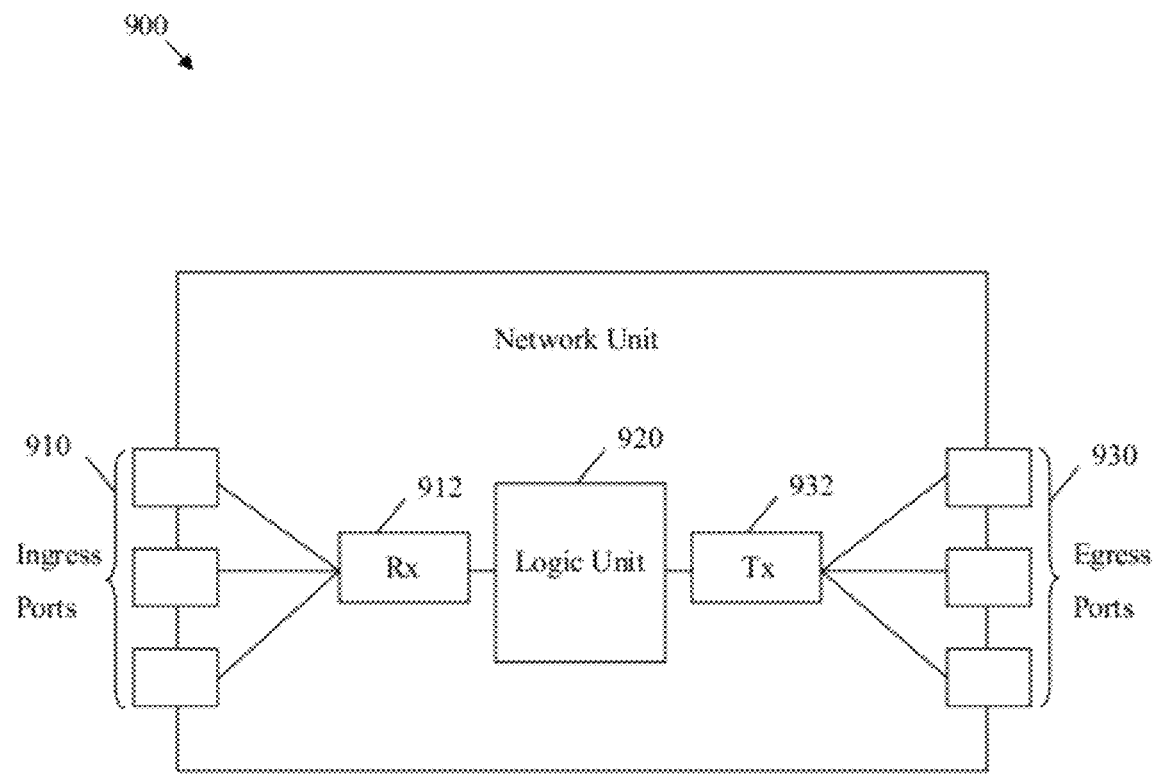
FIG. 9 is a schematic diagram of an embodiment of a network unit.

FIG. 9 illustrates an embodiment of a network unit 900, which may be any device that transports packets through a network. For instance, the network unit 900 may be located in any of the architectures described above, such as any of the CE, BR, B4, and AFTR components described above. The network unit 900 may comprise one or more ingress ports 910 coupled to a receiver 912 (Rx), which may be configured for receiving packets or frames, objects, options, and/or Type Length Values (TLVs) from other network components. The network unit 900 may comprise a logic unit or processor 920 coupled to the receiver 912 and configured to process the packets or otherwise determine to which network components to send the packets. The logic unit or processor 920 may be implemented using hardware, software, or both. The network unit 900 may also comprise one or more egress ports 930 coupled to a transmitter 932 (Tx), which may be configured for transmitting packets or frames, objects, options, and/or TLVs to other network components. The logic unit or processor 920, the receiver 912, and the transmitter 932 may also be configured to implement or support any of the schemes and protocols described above.

Figure 10:
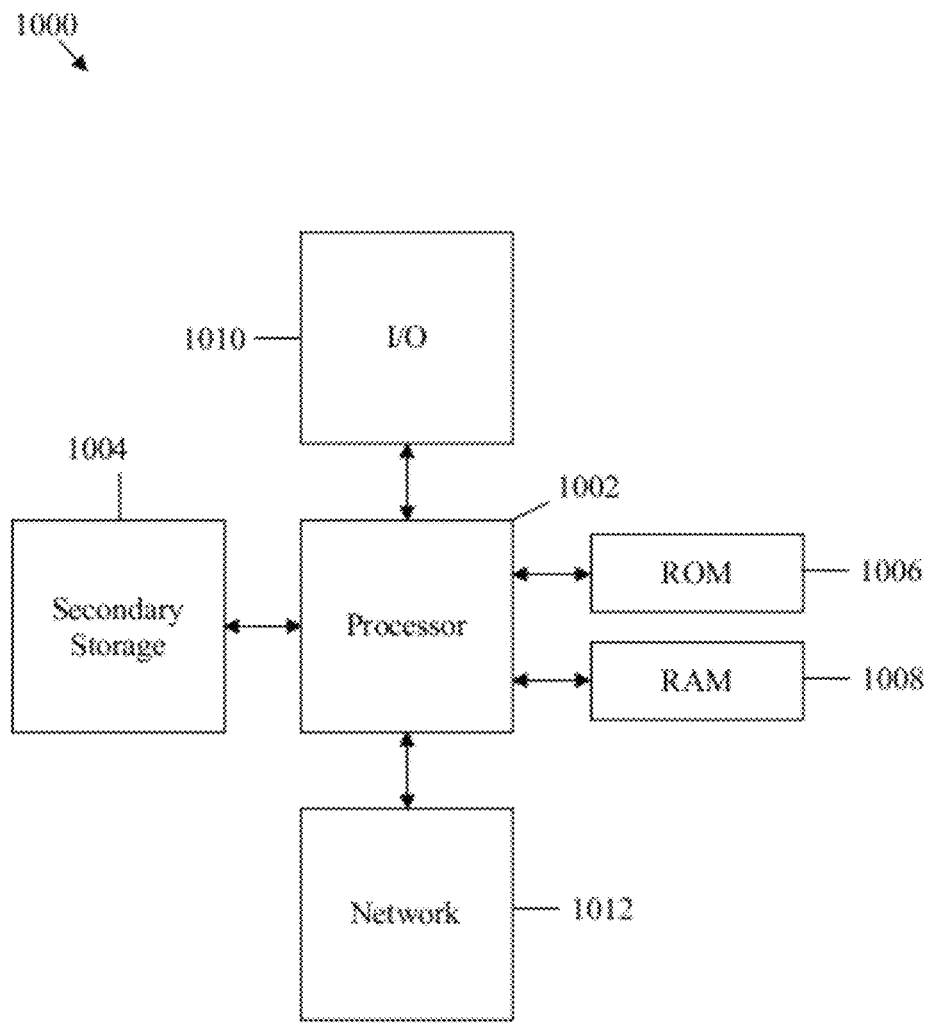
FIG. 10 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs) and/or digital signal processors (DSPs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to second storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network apparatus comprising:
   receiving a Multicast Listener Discovery (MLD) membership report message from a host;
   sending an Automatic Internet Protocol (IP) Multicast Tunneling (AMT) Relay discovery message comprising an anycast address for a border relay (BR) via an IP version four (IPv4) network;
   receiving an AMT Relay advertisement message comprising a unicast address for the BR via the IPv4 network;
   sending an AMT request message to the BR via an AMT tunnel;
   receiving an AMT query message comprising a MLD listener query from the BR via the AMT;
   sending an AMT membership message comprising the MLD membership report message of the host to the BR via the AMT tunnel; and
   receiving an AMT multicast data message comprising an encapsulated IP version six (IPv6) multicast message from the BR via the AMT tunnel,
   wherein the AMT Relay discovery message comprises a type field that indicates a type of the AMT relay discovery message, an M flag set to indicate an AMT Gateway is configured to encapsulate an MLD message in an IP version four (IPv4) packet for transmission to the BR, and a discovery nonce field that comprises a random value.

2. The method of claim 1 further comprising:
   decapsulating the encapsulated IPv6 multicast message; and
   forwarding the decapsulated IPv6 multicast message to the host.

3. An apparatus comprising:
   a memory comprising computer readable instructions that when implemented by a processor cause the processor to:
   receive a Multicast Listener Discovery (MLD) membership report message from a host;
   send an Automatic IP Multicast Tunneling (AMT) Relay discovery message comprising an anycast address for a border relay (BR) via an IPv4 network;
   receive an AMT Relay advertisement message comprising a unicast address for the BR via the IPv4 network;
   send an AMT request message to the BR via an AMT tunnel;
   receive an AMT query message comprising a MLD listener query from the BR via the AMT;
   send an AMT membership message comprising the MLD membership report message of the host to the BR via the AMT tunnel; and
   receive an AMT multicast data message comprising an encapsulated IPv6 multicast message from the BR via the AMT tunnel,
   wherein the AMT relay advertisement message comprises a type field that indicates a type of the AMT Relay advertisement message, an M flag that is set to indicate that the BR is configured to receive MLD messages, a discovery nonce field that comprises a random value, and a Relay Address field that comprises a unicast IPv4 address of the AMT Relay.

4. A computer program product comprising computer executable instructions stored on a non-transitory computer readable medium such that when executed by a processor cause a network apparatus to:
   receive a Multicast Listener Discovery (MLD) membership report message from a host;
   send an Automatic Internet Protocol (IP) Multicast Tunneling (AMT) relay discovery message via an Internet Protocol (IP) version four (IPv4) network that comprises an anycast address for a border relay (BR), an M flag set to indicate the network apparatus is configured to encapsulate an MLD message in an IPv4 packet for transmission to the BR, and a type field that indicates a type of the AMT relay discovery message, and a discovery nonce field that comprises a random value;
   receive an AMT Relay advertisement message comprising a unicast address for the BR via the IPv4 network;
   send an aggregated membership report message to the BR via an IP version six (IPv6) in IPv4 tunnel established with the BR across the IPv4 network; and
   receive an encapsulated IPv6 multicast message for an IPv6 group from the BR via the IPv6 in IPv4 tunnel.

5. The computer program product of claim 4, wherein the processor further causes the network apparatus to:

decapsulate the encapsulated IPv6 multicast message; and
forward the decapsulated IPv6 multicast message to the host that is subscribed to the IPv6 group.

6. The computer program product of claim 4, wherein the processor further causes the network apparatus to maintain a MLD proxy membership database that associates the host with an IPv6 group.

7. A computer program product comprising computer executable instructions stored on a non-transitory computer readable medium such that when executed by a processor cause a customer edge (CE) to:
 receive a Multicast Listener Discovery (MLD) membership report message from a host;
 send an Automatic Internet Protocol (IP) Multicast Tunneling (AMT) relay discovery message comprising an anycast address for a border relay (BR) via an Internet Protocol (IP) version four (IPv4) network;
 receive an AMT Relay advertisement message comprising a unicast address for the BR via the IPv4 network, wherein the AMT Relay advertisement message comprises an M flag set to indicate that the BR is configured to
 receive MLD messages, a type field that indicates a type of the AMT Relay advertisement message, a discovery nonce field that comprises a random value, and a Relay Address field that comprises a unicast IPv4 address of the AMT Relay;
 send an aggregated membership report message to the BR via an IP version six (IPv6) in IPv4 tunnel established with the BR across the IPv4 network; and receive an encapsulated IPv6 multicast message for an IPv6 group from the BR via the IPv6 in IPv4 tunnel.

8. A network component comprising:
 a receiver at a border relay (BR) configured to receive an aggregated membership report message from a customer edge (CE) across an Internet Protocol (IP) version four (IPv4) network that requests joining an IP version six (IPv6) group on behalf of a host of the CE, wherein the aggregated membership report message is encoded in an Automatic Internet Protocol (IP) Multicast Tunneling (AMT) relay discovery message packet comprising an M flag set to indicate CE is configured to encapsulate IPv6 multicast messages in IPv4 packets for transmission to the BR;
 a processor configured to establish an IPv6 in IPv4 tunnel with the CE, add a corresponding entry in a multicast membership database, and duplicate multicast IPv6 traffic received from an IPv6 network based on the multicast membership database; and
 a transmitter configured to:
 send an AMT relay advertisement message comprising a second M flag that is set to indicate that the BR is configured to receive MLD messages; and
 send the multicast IPv6 traffic to the CE via the IPv6 in IPv4 tunnel.

9. The network component of claim 8, wherein the BR receives an encapsulated Multicast Listener Discovery (MLD) membership report message via the IPv6 in IPv4 tunnel from the CE and returns a unicast IPv4 address for the BR to the CE.

10. The network component of claim 9, wherein the BR decapsulates the encapsulated MLD report membership message and updates the multicast membership database based on the decapsulated MLD report membership message.

* * * * *